United States Patent [19]

Cole

[11] Patent Number: 4,737,399
[45] Date of Patent: Apr. 12, 1988

[54] THREE-DIMENSIONAL STRUCTURES OF INTERLOCKED STRANDS

[75] Inventor: Paul M. Cole, Wilmington, Del.

[73] Assignee: E. I. Du Pont de Nemours and Company, Wilmington, Del.

[21] Appl. No.: 13,964

[22] Filed: Feb. 12, 1987

[51] Int. Cl.[4] ............................................. D03D 13/00
[52] U.S. Cl. ............................................ 428/222; 87/7
[58] Field of Search ............................... 428/222; 87/7

[56] References Cited

U.S. PATENT DOCUMENTS 1,182,035 5/1916 Rahm .
3,955,467 5/1976 Johnson, Jr. ............................ 87/7

Primary Examiner—James J. Bell

[57] ABSTRACT

A three-dimensional structure of interlocked strands is formed of axial and intertwining yarns which spiral in a path through the structure. Each strand has a distinct zone of occupancy in every cross section of the structure and does not depart from that zone.

8 Claims, 5 Drawing Sheets

THREE-DIMENSIONAL STRUCTURES OF INTERLOCKED STRANDS

BACKGROUND OF THE INVENTION

This invention relates to three-dimensional structures of interlocked strands and more particularly it relates to such structures in composite material.

Fiber-reinforced plastic structures have been used for many years with increasing success because of their high strength, light weight and ease of fabrication compared to the wood or metal structures which they replace. Fibers such as glass, carbon, ceramic and aramid are popular as reinforcement, and thermosetting as well as thermoplastic resins are common polymeric matrices.

Braiding with axial yarns is one process for producing such structures and generally comprises forming an array of axial yarns extending substantially parallel to the axis of the structure and interlacing braiding yarns in a pattern through the array so they are interlaced with one another and with the axial yarns. Known braiding patterns does not provide the control of the yarns necessary to locate them at particular locations in the structure so that such locations can have the characteristics of a particular yarn. This control is not possible with known braiding processes because they have strands that move throughout the process.

SUMMARY OF THE INVENTION

This invention, through a unique interlock twining process, allows a manipulation of strands to form complex shaped structures with precise strand placement so that all component strands at a given location in the structure have a distinct zone of occupancy and as a consequence those zones can have particular characteristics, for example:

a. expensive yarns with premium properties can be limited to high stress locations, b. yarns with high tensile properties can be given one location while yarns with high shear properties can be given a different location, c. yarns with good abrasion resistance can be limited to surface locations, and d. bulky yarns can be located separately from lean yarns.

The product is a structure of interlocked strands comprising an array of axial strands extending longitudinally of the structure and a plurality of intertwining strands spiraling in a helical path through the structure wherein at least one intertwining strand spirals in a helical path around at least three axial strands located in more than one plane forming a first cell and said one intertwining strand spirals around at least one axial strand of an adjacent second cell comprised of a second set of at least three axial strands formed by at least one other intertwining strand spiralling the second set of axial strands and at least one axial strand of the first cell in a helical path whereby the adjacent cells are interlocked by the intertwining strands. Strands within the product can be given predominant rectilinear orientation or can be given angular orientation. A continuous chain of strands can be provided along a product surface to maximize resistance to lateral bending forces. Small cells can be employed for refinement of shape, where needed, without requiring the fine construction to be employed elsewhere.

Product weight reduction can be realized by providing cells with hollow centers or voids without sacrifice of structural integrity. The structure around these voids will be completely interlocked. This contrasts with braiding practice where creation of a void can subject the unsupported yarn to futile tension around the void. In summary, the spiraling of one strand around others creates a cell which can be defined as an interlaced combination of strands that has all essentials for interlocking with other cells in the formation of a product. There is no known counterpart for these cells in the prior art. The total product is an assembly of interlocked cells that are arranged to provide the desired form. The cells within a given product can have a variety of characteristics. The yarn components can be different. The cells are like building blocks that can be put together in many different patterns and compound cells can have central voids formed between cells while others may have strands axially oriented through the voids and trapped between cells either for strength or for body.

Fibers such as glass, carbon, ceramic and aramid yarns are commonly used as strands, and thermosetting as well as thermoplastic resins are common polymeric matrices.

A matrix material may be added to any of the structures made by this invention to form a rigid composite. For example, a three-dimensional braided structure can be shaped as a T-beam and rigidized to form a structural member.

DETAILED DESCRIPTION OF THE ILLUSTRATED EMBODIMENT

Figure 1:
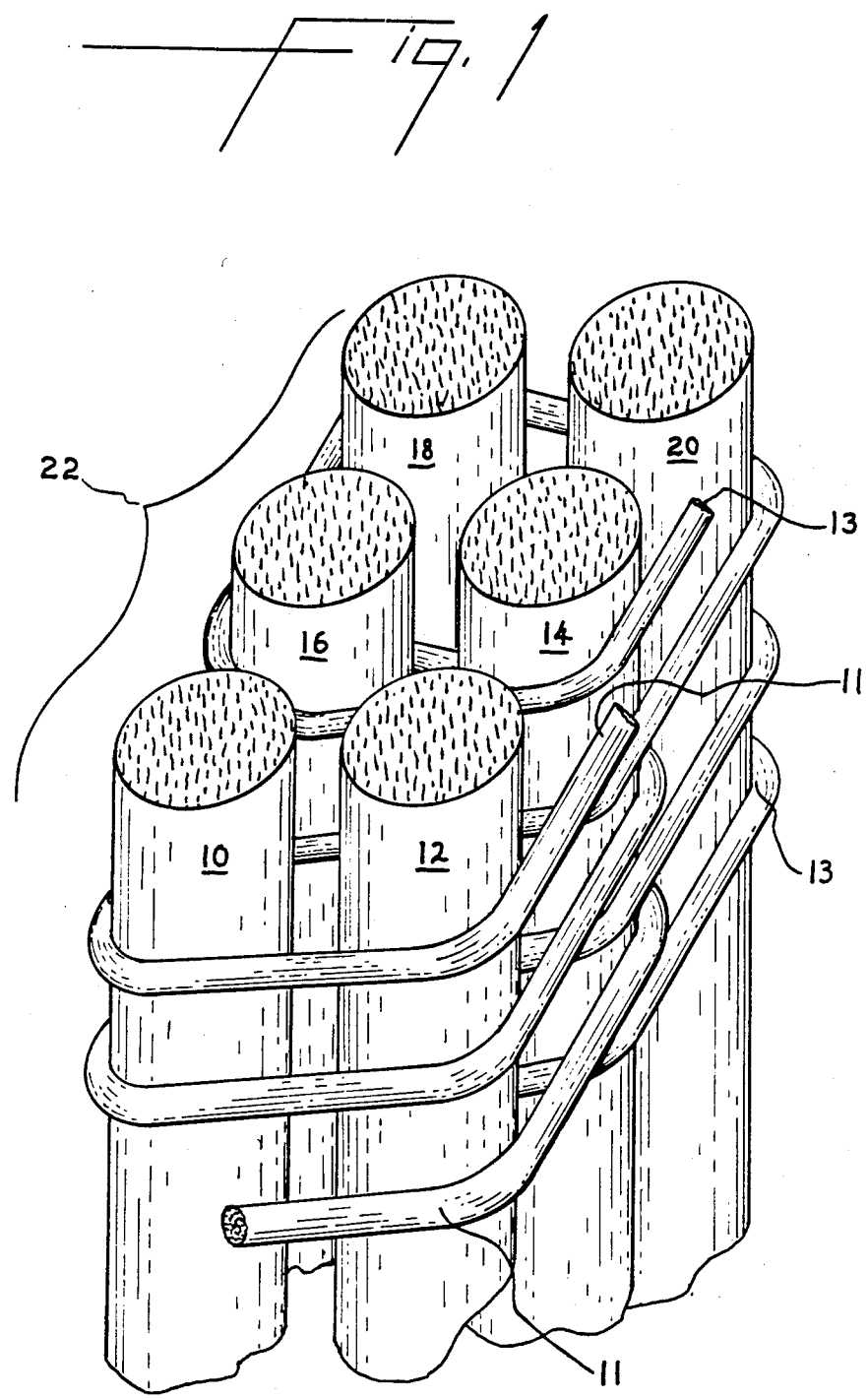
FIG. 1 is a perspective view of a structure according to the invention of two cells interlocked to form a structure.

Referring now to FIG. 1, the structure of this invention involves two essential categories of strands, i.e., strands designated 10, 12, 14, 16, 18, 20 that have general axial alignments and strands 11 and 13 which spiral in paths around strands 10–20. The paths of strands 11 and 13 overlap around strands 16 and 14 to execute an interlocking around the axial yarns 10–20. The axial yarns move vertically to form the structure 22 although other directions will work equally as well. The rate at which the axial strands 10–20 move controls the pitch of the spirals formed by strands 11 and 13.

Figure 2:
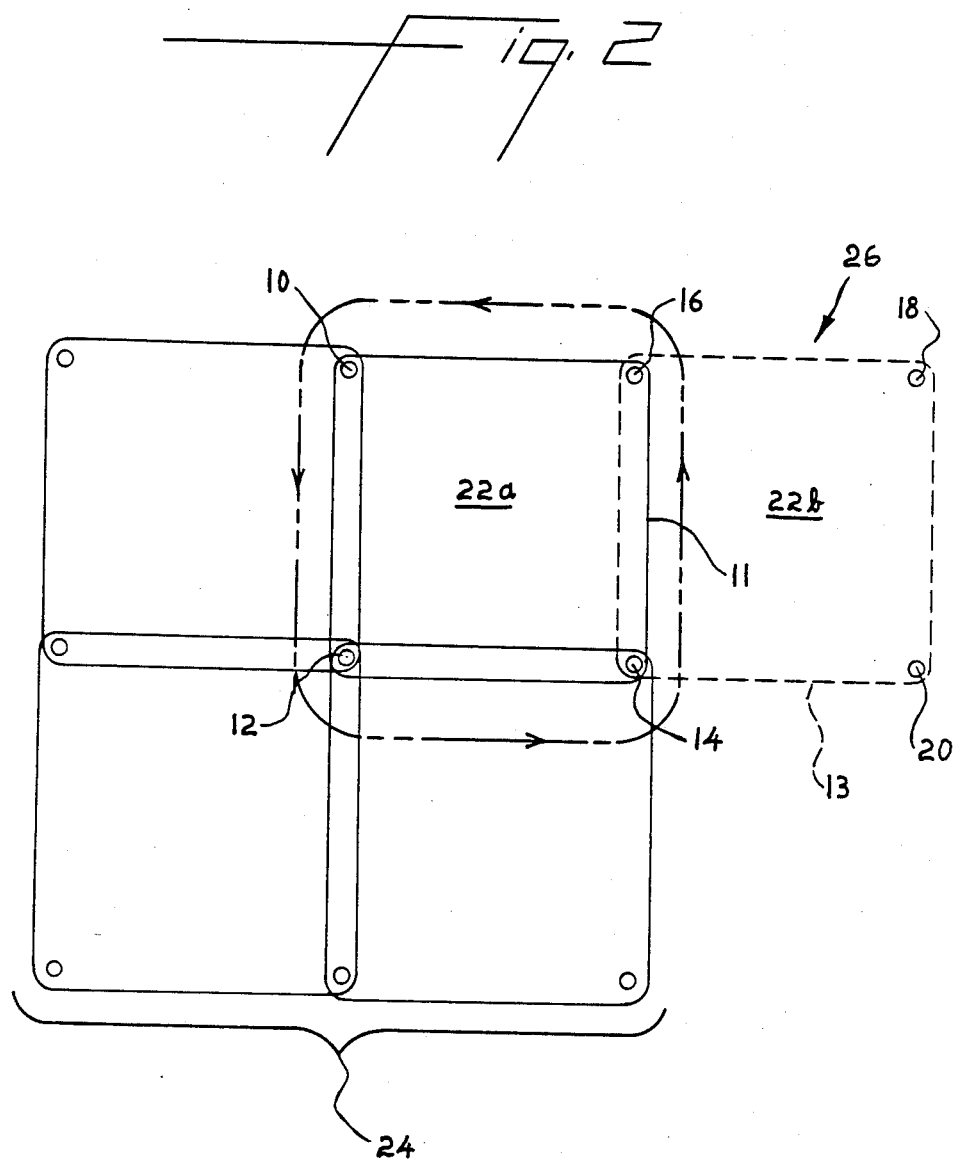
FIG. 2 is a motion diagram showing the forming of a structure according to the invention involving four axial strands.
Figure 3:
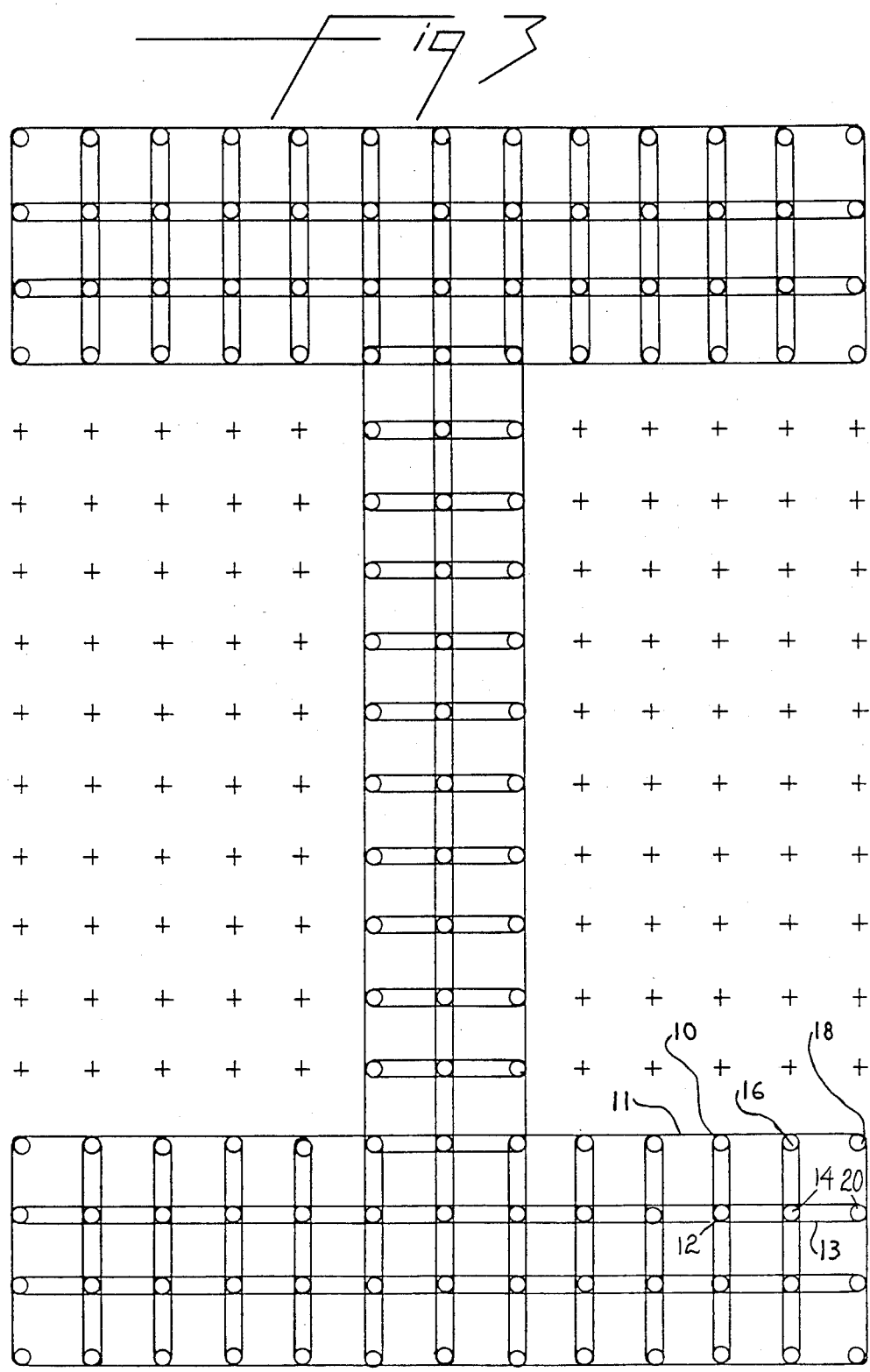
FIG. 3 is a diagram showing the cell formed according to FIG. 2 in the shape of an I beam.
Figure 4:
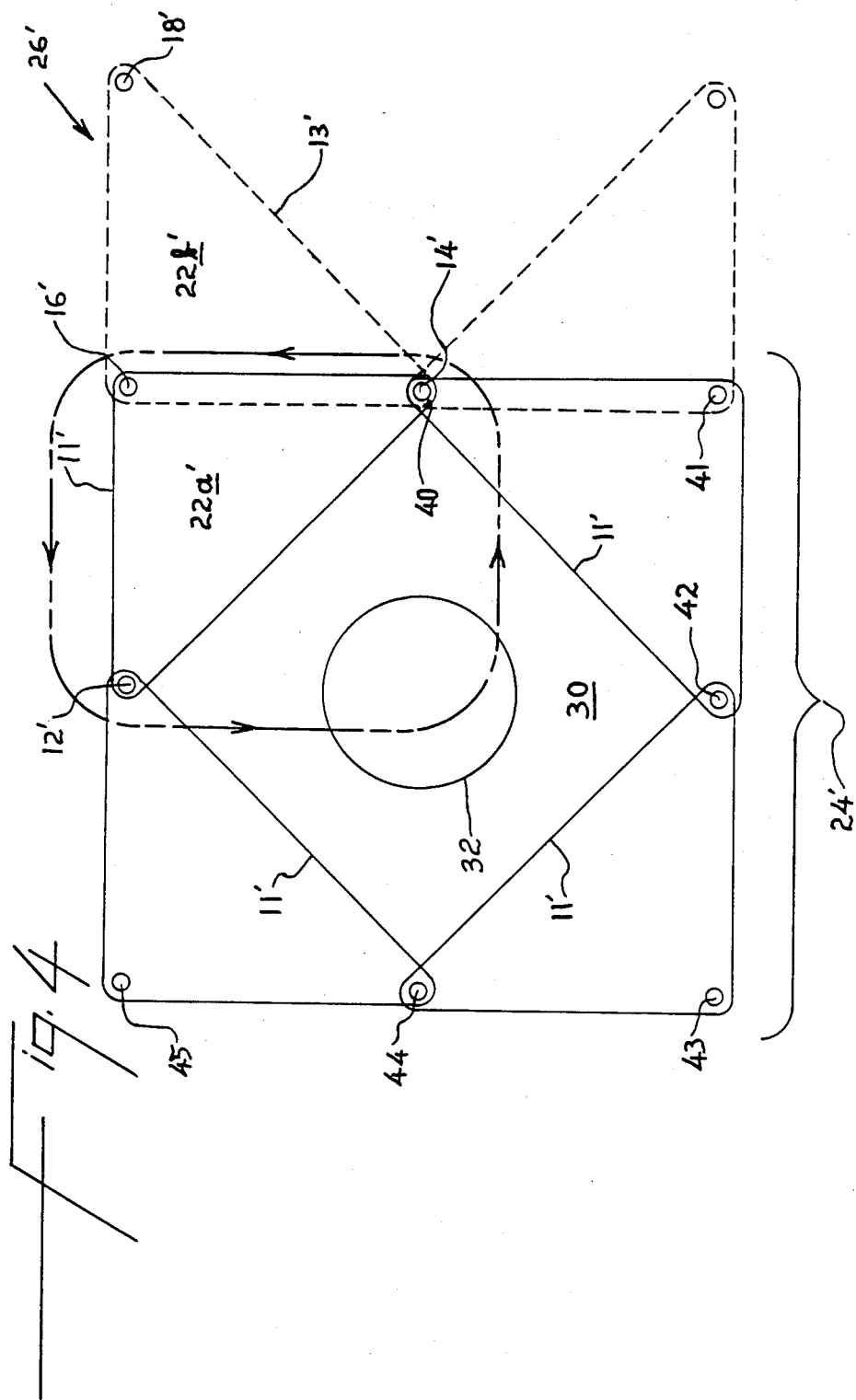
FIG. 4 is a motion diagram showing the forming of a structure according to the invention involving three axial strands.
Figure 5:
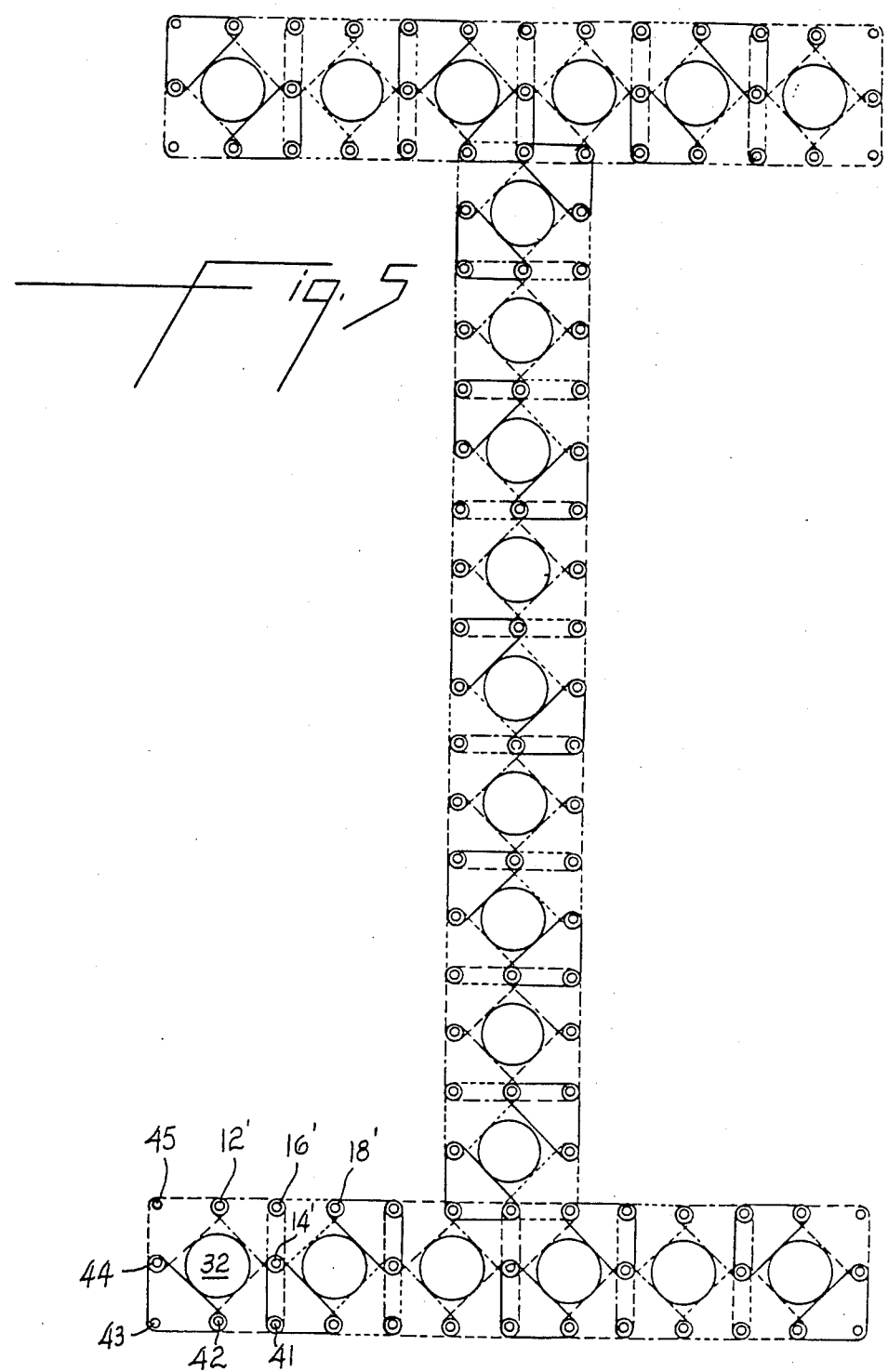
FIG. 5 is a diagram showing the cell formed according to FIG. 4 in the shape of an I beam.

As stated above, the spiraling of one strand around others creates a cell which is then interlocked with other cells to form a total structure. The cells within a given structure can have a variety of characteristics. For example, the strand components can be different yarns. The construction can be a circle four such as shown in FIG. 2 wherein the solid lines 11 around axial strands 10, 12, 14, 16 show the creation of cell 22a that is interlocked to an adjacent cell 22b by dashed lines 13. Lines 11 and 13 represent spiraling strands. FIG. 3 represents a circle four construction in the form of an I beam. Similarly a construction called circle three is shown in FIG. 4 wherein solid lines 11' around axial yarns 12', 14', 16' and 18' show creation of a cell 22a' interlocked to a cell 22b' by dashed lines 13'. Lines 11'0 and 13' represent spiraling strands. In addition, compound cells such as 24' may be formed with a central void such as indicated by the numberal 30 and the void may contain an axial strand 32 trapped between cells by the spiraling of strands 11' around axial strands 12', 40, 41, 42, 43, 44, and 45. FIG. 5 represents a circle three construction in the form of an I beam.

EXAMPLE

An I beam structure was prepared by using 108 ends of 9000 denier nylon cord as axial yarns, 84 ends of 8200 olefin yarn as the intertwining yarns and 21 ends of 216,000 denier rope as axial yarns to be trapped within a cell as it is formed.

The twining was carried out by hand movement as detailed above in connection with the circle three construction shown in FIG. 4.

The twining process was continued until a 14 inch length in the form of an I beam was formed using the complete motion pattern of FIG. 5.

The outer surfaces of the I beam formation were then given a heavy spatula coating of epoxy resin and encased in a clamped wood form that matched the I beam formation. After 24 hours of curing at room temperature, the wood form was removed. A cross sectional cut was made in I beam formation with a hack saw. Examination of the cut ends showed good epoxy penetration.

I claim:

1. An interlocked yarn structure comprising: an array of axial yarns extending longitudinally of the structure and a plurality of intertwining yarns which spiral in a helical path through the structure wherein at least one intertwining yarn spirals in a helical path around at least three axial yarns located in more than one plane forming a first cell and said one intertwining yarn spiraling around at least one axial yarn of an adjacent second cell comprised of a second set of at least three axial yarns formed by at least one other intertwining yarn spiraling said second set of axial yarns and at least one axial yarn of said first cell in a helical path whereby the adjacent cells are interlocked by said intertwining yarns.

2. The structure of claim 1, wherein four axial yarns form each cell.

3. The yarn structure of claims 1 wherein a plurality of cells form the structure and an additional axial yarn is centrally located between the cells.

4. The structure of claim 1, 2, or 3 wherein said axial yarns and said intertwining yarns are of continuous filaments impregnated with polymer.

5. The structure of claims 1, 2 or 3 wherein said structure is impregnated with polymer.

6. The structure of claims 4 or 5 wherein the structure is an I beam and said polymer is a thermosetting resin.

7. The structure of claim 4 or 5 wherein said structure incorporates voids therein.

8. A method for forming an interlocked yarn structure comprising: moving an array of axial yarns longitudinally of the structure and spiraling at least one intertwining yarn in a helical path around at least three axial yarns located in more than one plane to form a first cell while spiraling said one intertwining yarn around at least one axial yarn of an adjacent second cell of a second set of at least three axial yarns formed by at least one other intertwining yarn spiraling the second set of axial yarns located in more than one plane and at least one axial yarn of the first cell whereby the adjacent cells are interlocked to form said structure.

* * * * *